Dec. 24, 1946.     F. A. BARNES     2,412,957
MACHINE TOOL CONTROL
Filed June 28, 1944

Inventor
FREDERICK A. BARNES
By Raymond D. Junkins
Attorney

Patented Dec. 24, 1946

2,412,957

UNITED STATES PATENT OFFICE 2,412,957

MACHINE TOOL CONTROL

Frederick A. Barnes, Cleveland Heights, Ohio, assignor to Bailey Meter Company, a corporation of Delaware Application June 28, 1944, Serial No. 542,541

3 Claims. (Cl. 82—5)

This invention relates to a control system for machine tools, and more particularly to a control system for governing the relative rate of movement between the tool and the work piece of a machine tool.

One object of my invention is to provide a control system for a machine tool or the like whereby the tool may be advanced relative to the work piece at a predetermined rate of speed.

A further object of my invention is to provide a control system for a machine tool whereby the tool may be advanced relative to the work piece at a rate directly proportional to the speed of rotation of the work piece.

Still another object of my invention is to provide a control system for a lathe whereby the tool will be moved longitudinally along the lathe at a rate of speed directly proportional to the rate of rotation of the work piece.

A still further object of my invention is to provide a control system for a lathe whereby a thread of accurate pitch may be cut on a work piece.

Another object of my invention is to provide a control system for a lathe for advancing the tool along the work piece at a rate of speed directly proportional to the rate of rotation of the work piece without employing a lead screw or other mechanical means subject to wear.

A further object of my invention is to provide a control system for a lathe whereby accurate screw cutting may be accomplished without dependence upon a lead screw, the wear of which affects the accuracy of the operation.

As a specific embodiment of my invention I preferably describe an engine lathe wherein the spindle is rotated at a preselected uniform speed by any means, either mechanical, electrical or hydraulic, and where the longitudinal travel of the tool is accomplished by a hydraulically actuated servo-motor. The specific object of the invention being a control of the two independent driving means to produce a preselected relation of speed therebetween.

Further objects will be apparent from the description and drawing, in which.

Figure 1:
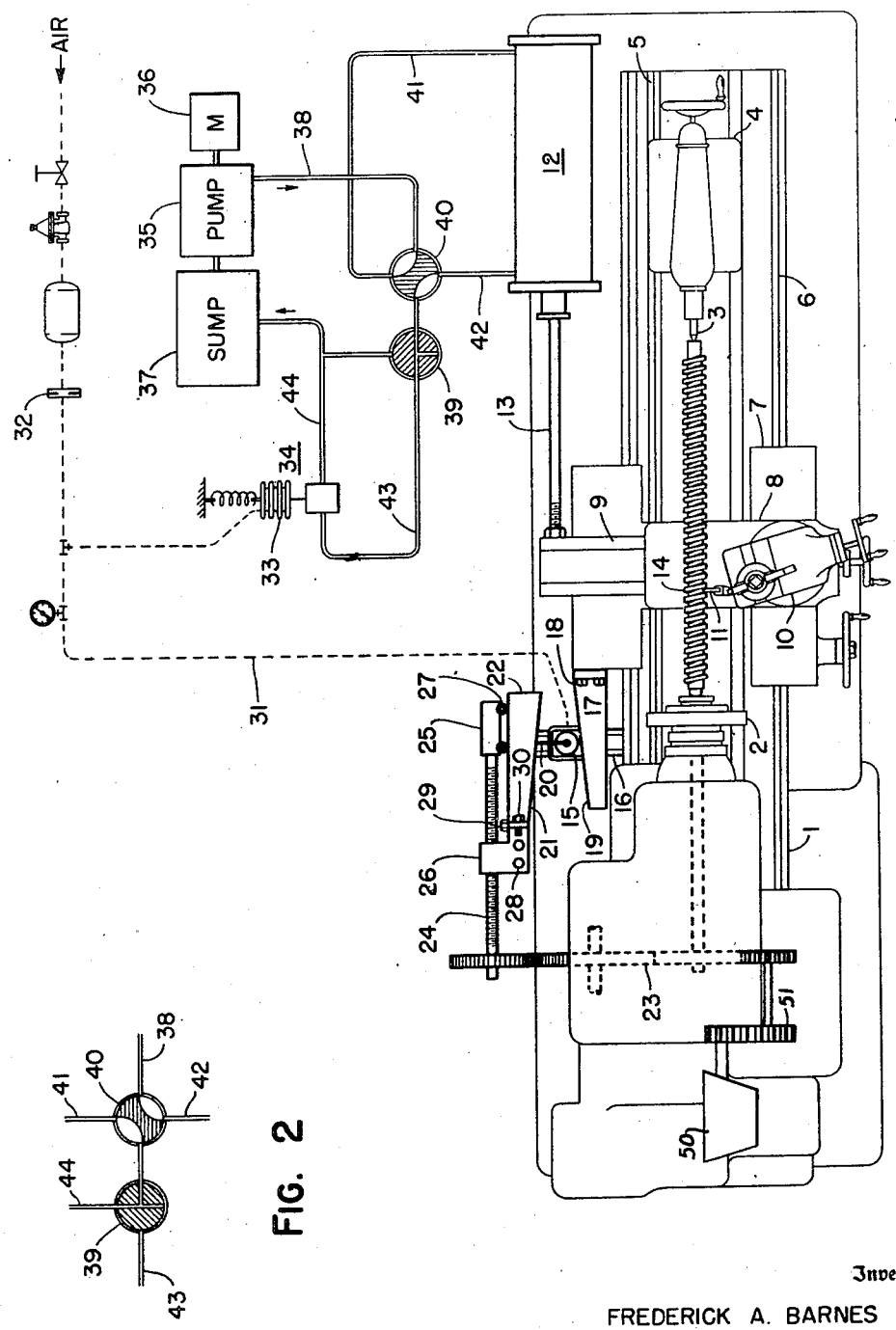
Fig. 1 is a somewhat diagrammatic plan view of an engine lathe illustrating the application of my invention thereto.

Referring to Fig. 1, I show therein my invention applied to an engine lathe I having a head stock or live center 2 adapted to be rotated at preselected or desired speed by any suitable means, such as mechanical means, an electric motor, a hydraulic motor, or the like. The lathe has a tail stock or dead center 3 supported on a carriage 4 which is manually adjustable along the bed of the lathe in suitable ways 5. As one example I show a motor 50 driving the head stock 2 through change gears 51. Also movable longitudinally along the bed of the lathe in suitable ways 6 is a carriage 7. Mounted on the carriage 7 is a cross-slide 8 movable on ways 9 transversely of the bed of the lathe.

The cross-slide 8 is provided with an adjustable tool support 10 in which is secured a tool 11. Transverse movements of the tool 11 are produced by manual adjustments. That is, the tool is manually moved by means of the cross-slide 8 on the ways 9 into engagement with the work piece, the depth of cut is determined by the manual adjustment of the cross-slide transversely of the axis of the work piece and the shape of the cut is determined by the shape of the cutting tool. Longitudinal movements of the tool 11, that is movements of the tool parallel with the axis of the work piece along the ways 6, are produced by means of a hydraulic servo-motor generally indicated at 12 which is secured to the bed of the lathe and is connected by means of a piston rod 13 to the carriage 7.

Supported between the head stock 2 and the tail stock 3 is a work piece 14 on which, as illustrated, a machine thread is being cut. In order that the thread will have a given pitch, as well known to those familiar with the art, it is necessary that the carriage 7, and accordingly the tool 11, advance along the lathe a given amount per revolution of the work piece 14. In the ordinary lathe such advancement is obtained by gearing the carriage by means of a lead screw to the driving means of the head stock. Such an arrangement imposes a heavy load on the lead screw however, which after a period of time wears so that the threads on the work piece are not longer accurately formed. Furthermore, either no adjustable possibilities are obtainable or else the adjustments are by such major steps as to be of substantially no use.

By my invention the carriage 7 is advanced at a speed necessary to give the thread on the work piece a desired pitch without a direct mechanical connection to the driving shaft of the head stock and without employing a lead screw or other means subject to wear, but through providing a continual check-back against the actual relation of speed of the work and speed of the tool.

In distinction to the ordinary means I employ a tracer mechanism, one form of which is generally indicated at 15 in Fig. 1 whereby I establish a pneumatic loading pressure for controlling the rate of movement of the carriage 7. The loading pressure so established varies from a predetermined value, which for convenience I call the normal value, in accordance with the departure of the rate of movement of the carriage 7 from that desired, and such variations are effective to restore the rate of movement of the carriage 7 to that desired. In other words, it may be said that so long as the carriage 7 moves at the desired speed the loading pressure remains at the normal value, but upon the slightest departure from the desired speed a corresponding change in the loading pressure occurs effective for restoring the speed of the carriage 7 to that desired.

The tracer mechanism 15 is preferably of the type described and claimed in my copending application Serial No. 542,920 to which reference may be had for full constructional and operational details. Suffice it to say here that the tracer mechanism comprises a body member 15 slideably mounted on ways 16 transversely of the lathe. The body member 15 is adapted to be engaged by and positioned by a cam 17, which is adjustably (as at 18) mounted to the carriage 7 and positioned therewith through the agency of the piston rod 13. The cam 17 may be of relatively thin plate, massive enough for rigidity and to obviate distortion. Its contact edge 19 is preferably a slow incline so that full longitudinal travel of the carriage 7 results in a transverse movement of the tracer assembly a predetermined number of inches. The tracer body 15 is preferably spring biased along the ways 16 toward the contact edge 19 so that it is always in contact with the contact edge or profile of the cam 17. Extending from the tracer body 15 is a tracer arm or feeler 20 adapted to engage the contact edge 21 of a template 22.

The template 22 is positionable longitudinally of the lathe by the live center 2 through any convenient means such as a gear train 23. The gears 23 may drive a worm 24 journaled at one end in a fixed block 25 and traveling a nut 26 to which the template 22 is fastened. The journal block 25 is provided with rollers 27 guiding and supporting the template 22 as it moves along. The template is adjustably fastened to its driving nut 26 by means 28 so that the complete template may be removed and replaced with one having a different slope. The adjustment means 29 and 30 allow slight adjustment of the position of any particular template 22 relative to the driving nut 26 after the assembly has been fastened to the nut 26 by means of the screw 28. Inasmuch as the load on the screw 24 is very light there is little tendency for wear, distortion or deflection of the screw 24.

It is apparent that the requisite for cutting a uniform thread is the advancement of the tool 11 at a uniform speed while the work 14 is rotated at a uniform speed. Changes in the relative speeds determine the pitch of the thread. As the cams 19 and 21 are moved in opposite directions past the tracer 15, 20 the relative position of the parts 15 and 20 must remain constant if the thread is to be true. The deflection of the tracer arm 20 relative the body 15 determines the bleed to atmosphere of air from the pipe 31 and consequently the speed of travel of the carriage and tool and therefore the pitch of the thread. Change in the relative speed of the work piece and the tool, and consequently change in the pitch of the screw, is accomplished by adjusting the cams 19 and 21 relative to each other through the agency of the adjusting means 18, 29 and 30.

As previously mentioned, the tracer feeler 20 engages the contact edge 21 of the template 22, while the tracer body 15 is engaged by the contact edge 19 of the cam 17. Variation in distance between the contact surfaces 19 and 21, at the engagement line of the assembly 15, 20, results in more or less deflection of the feeler 20 relative to the body 15 from a predetermined or normal condition of deflection.

In general, the function of the tracer mechanism is to vary the rate of discharge to the atmosphere of a pressure fluid supplied to the assembly 15 through the pipe 31 at the outlet side of a fixed orifice 32 to which air under relatively higher pressure is supplied from any convenient source. Under normal conditions of deflection of the feeler 20 there is a constant small discharge of air to the atmosphere with a corresponding predetermined pressure within the pipe 31. As the deflection of the feeler 20 relative to the body 15 increases or decreases the pressure within the pipe 31 is varied in predetermined degree. The object of the arrangement is for the tracer 15 to so control the servo-motor 12 as to maintain constant the rate of discharge of fluid from the tracer 15 to the atmosphere. The controlled air pressure representative of changes in the deflection of the feeler 20 is effective upon a bellows 33 of a fluid resistance assembly 34.

I show an oil pump 35 driven by a motor 36 and drawing its supply of oil from a sump 37. Oil under pressure is supplied the servo-motor 12 through a pipe 38. In connection with the hydraulic motor 12 and the adjustable fluid resistance assembly 34 I provide switching valves 39 and 40 arranged to be moved together to either a "normal" or a "rapid traverse" position of operation of the hydraulic motor 12. The valves 39 and 40 are shown in Fig. 1 in the "normal" operating position. Oil under pressure from a pump 35, driven by a motor 36, is forced through the pipe 38, the valve 40 and a pipe 41 to one end of the hydraulic motor 12. Oil from the other end of the motor 12 passes through a pipe 42, the valve 40, the valve 39, the pipe 43, the adjustable fluid resistance 34 and the pipe 44 to a sump 37. The regulation of the variable resistance 34 determines the rate of flow of oil through the pipe 42 and consequently the rate of travel of the piston rod 13 toward the left of the drawing. Thus the rate of longitudinal travel of the tool 10 along the work piece 14 is controlled by the variable resistance 34 to passage of oil therethrough from the left-hand end of the motor 12.

Figure 2:
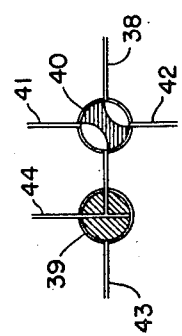
Fig. 2 is a diagrammatic representation of a pair of reversing valves of Fig. 1 in an alternate position of operation.

In Fig. 2 I show the passage relation of the switching valves 39, 40 for a "rapid return" of the piston rod 13 from left to right of Fig. 1. That is for a rapid return of the tool 11 to the beginning of its working travel. Oil from the pump 35 passes directly through the pipe 38, the valve 40 and the pipe 42; while oil from the right-hand end of the motor 12 passes directly through the pipe 41, the valve 40 and the valve 39 to the pipe 44 and sump 37. Thus on the rapid return of the piston rod 13 there is no throttling of its speed of travel by the variable resistance 34, and thus the tool is traversed to the right at maximum speed.

Under normal operating conditions the feeler 20 is deflected relative to the housing 15, causing a slight bleed of air to the atmosphere, a reduction of pressure within the pipe 31, and an effective pressure within the bellows 33 of 35 psi for example. If the contact surfaces 19, 21 tend to move away from each other, or move toward each other, thus varying the deflection of the tracer 20 relative to the body 15, the pressure effective within the bellows 33 will increase to some 45 psi, or decrease to some 25 psi. Under the normal pressure condition the fluid pressure effective within the bellows 33 so positions the parts of the assembly 34 that a predetermined resistance is offered by the assembly 34 to passage of oil therethrough from the pipe 43 to the pipe 44. If the deflection of the feeler 20 relative to the housing 15 increases or decreases there will be a corresponding variation in the loading pressure effective within the bellows 33 and desirably a change in the rate of flow of oil from the pipe 43 to the pipe 44.

Three general conditions of operation may exist.

1. The speed of rotation of the work piece 14 is represented by the rate of longitudinal movement of the template 22. This is compared to the rate of longitudinal movement of the cam 17, which is representative of the travel of the tool 11 along the work 14. If these two rates of travel are in desired relation, then the distance between the surfaces 19 and 21 at the point of engagement of the feeler 20 remains constant and is such a distance as to produce desired pressure within the pipe 31 and desired rate of travel of the tool 11 along the work piece.

2. If for some reason the rate of longitudinal travel of the tool 11 and cam 17 is faster than is desired, relative to the rate of longitudinal travel of the template 22, then the contact surfaces 19, 21 will tend to approach each other, producing a greater deflection of the feeler 20 relative to the housing 15 and resulting in an increased pressure within the bellows 33. Such increase in pressure will tend to throttle off the passage between the pipes 43 and 44 and to thereby decrease the rate of travel of the piston rod 13 and cam 17 until the rate of travel of the cam 17 and the template 22 are in predetermined relation again.

3. If for some reason the rate of travel of the cam 17 is slower than the rate of travel of the template 22 then the contact surfaces 19, 21 will tend to recede from each other and the feeler 20 will be deflected a lesser amount relative to the body member 15. This results in a lowering of pressure within the bellows 33 with consequent decrease in resistance to passage of oil from the pipe 43 to the pipe 44 and a speeding up of longitudinal travel of the piston rod 13 and cam 17 relative to the template 22.

Thus upon any tendency of the rate of travel of the tool 11 to depart from predetermined relation to the rate of travel of the template 22 (representative of the speed of rotation of the work 14) there will be a correction through the agency of the servo-motor 12 to the rate of longitudinal travel of the tool 11 and cam 17. The tendency always being to travel the tool along the work at a speed in predetermined relation to the rate of rotation of the work 14.

After a complete traverse of the work has been accomplished by the tool 11 the operator moves the reversing valves 39, 40 to the position shown in Fig. 2, which removes the effect of the variable fluid resistance 34 from the servo-motor 12, putting full oil pump pressure upon the left-hand end of the motor 12 and opening the right-hand end directly to the sump, resulting in travel of the piston rod 13 to its left-hand end or starting position at maximum possible speed.

It will be understood that I have illustrated my invention in quite diagrammatic fashion, and that well recognized methods of gearing or speed reduction may be used as necessary to properly interrelate the various moving parts. For instance, the cam 17 might take a form other than that which I have illustrated as being driven directly by the piston rod 13. In like manner the template 22 may take a different form and be driven in a different manner just so long as it is representative of the speed of rotation of the spindle 2 and work piece 14. Declutching, high speed back travel and travel limits of common form may be incorporated in connection with the movement of the template 22 to return it to a position equivalent to the beginning of the cutting stroke of the tool 11 for a second or third passage of the tool along the work piece 14 if such is required.

While I have illustrated and described certain preferred embodiments of my invention, it will be understood that they are by way of example only and that I am not to be limited thereto except as defined in the following claims.

What I claim as new, and desire to secure by Letters Patent of the United States, is:

1. In combination with a lathe having a relatively movable tool and work piece, means for rotating the work piece at substantially constant speed, a carriage for the tool adapted to position the tool longitudinally along the work piece, a hydraulic motor for moving the carriage, a reciprocating cam, means for positioning the cam along a rectilinear path by and with the carriage, a template disposed in opposing relation to and adjacent said cam, means including a connection with the first named means to move the template along a path parallel to that of said cam, and fluid pressure means mounted between and under the joint control of said cam and template arranged to control the hydraulic motor.

2. The combination of claim 1 in which said fluid pressure means includes a two element valve normally discharging fluid to the atmosphere to establish a fluid pressure value representative of relative positions of the two elements of the valve, one element being positioned by said cam and the other element positioned by said template.

3. In combination with a machine tool having a relatively movable tool and work piece, means for rotating the work piece at substantially uniform speed, a carriage supporting the tool and movable longitudinally of the work piece, motor means for moving the carriage, a relatively thin plate cam adapted to be positioned with the carriage and thereby representative of speed of carriage movement, a second relatively thin plate cam adapted to be positioned by the first named means and thereby representative of the speed of rotation of the work piece, the two cams movable in substantial parallelism in a single plane with their cam surfaces opposed, and means under the joint control of the two cams controlling said motor means, said motor controlling means comprising two interrelated members, one of said members positioned by one of the cam surfaces and the other of said members positioned by the other cam surface, the speed of travel of the carriage being responsive to variation in distance between said cam surfaces.

FREDERICK A. BARNES.